United States Patent
Morrison et al.

(10) Patent No.: US 11,010,228 B2
(45) Date of Patent: May 18, 2021

(54) APPARATUS, SYSTEMS, AND METHODS FOR IDENTIFYING DISTRIBUTED OBJECTS SUBJECT TO SERVICE

(71) Applicant: International Business Machines Corporation, Armonk, NY (US)

(72) Inventors: Keith G. Morrison, Saratoga, CA (US); Ye Na Chen, Shanghai (CN); Guang Feng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/290,513

(22) Filed: Mar. 1, 2019

(65) Prior Publication Data

US 2020/0278899 A1    Sep. 3, 2020

(51) Int. Cl.
*G06F 11/07* (2006.01)

(52) U.S. Cl.
CPC ...... *G06F 11/0772* (2013.01); *G06F 11/0709* (2013.01); *G06F 11/0751* (2013.01)

(58) Field of Classification Search
CPC ............. G06F 11/0772; G06F 11/0709; G06F 11/0751; G06F 11/07; G06F 11/006
See application file for complete search history.

(56) References Cited

U.S. PATENT DOCUMENTS

| | | | |
|---|---|---|---|
| 2012/0042198 A1 | 2/2012 | Han et al. | |
| 2015/0095424 A1* | 4/2015 | Shimada | G06F 11/0766 709/204 |
| 2015/0212901 A1* | 7/2015 | Aggarwal | G06F 11/0778 714/15 |
| 2015/0242416 A1* | 8/2015 | Nakano | G06F 11/0709 707/694 |
| 2015/0248460 A1* | 9/2015 | Machida | G06F 16/128 707/639 |
| 2016/0098310 A1 | 4/2016 | Boecker et al. | |
| 2016/0119202 A1* | 4/2016 | Iyer | G06F 11/0772 714/37 |
| 2016/0277260 A1 | 9/2016 | Griffith et al. | |
| 2017/0075743 A1* | 3/2017 | Zhu | G06F 11/0751 |
| 2017/0123889 A1* | 5/2017 | Haridas | G06F 16/16 |
| 2018/0336084 A1* | 11/2018 | Kim | G06F 11/0757 |

* cited by examiner

*Primary Examiner* — Yolanda L Wilson
(74) *Attorney, Agent, or Firm* — Kunzler Bean & Adamson

(57) ABSTRACT

Methods that can identify distributed objects that are subject to service are disclosed herein. One method includes receiving, by a processor, a service event from a first server in which the service event includes a first object in the first server that is subject to service and for which the first server is unable to determine an identity of the first object. The method further includes determining the identity of the first object based on a first object model for a second server and notifying a user of the identity of the first object in the first server that is subject to service. Apparatus, systems, and computer program products that can include, perform, and/or implement the methods are also disclosed herein.

20 Claims, 10 Drawing Sheets

APPARATUS, SYSTEMS, AND METHODS FOR IDENTIFYING DISTRIBUTED OBJECTS SUBJECT TO SERVICE

FIELD

The subject matter disclosed herein relates to storage systems and, more particularly, relates to apparatus, systems, and methods that can identify distributed objects that are subject to service.

BACKGROUND

Conventional storage systems can include multiple servers. Further, various objects or components included within a storage system can be distributed among its various servers. In some configurations, various servers may include objects or components that are specific to or resident on a particular server, which can be referred to as native objects or native components. Further, each server may include a respective hardware object model that provides a description of the various objects or components included thereon and can be utilized to identify each of the various objects/components in the case of an error/malfunction being experienced by an object/component. The hardware object model for a particular server typically does not include a description of the various objects or components that are specific to or resident on other servers, which can be referred to as non-native objects or non-native components with respect to a particular server.

In some conventional storage systems, a particular server may be responsible for identifying when an object/component in or resident on another server needs to be serviced and/or for generating a service event for such object/component. Here, issues can arise in conventional storage systems when an object/component that is subject to service is non-native to the server responsible for identifying and/or generating a service event for the object/component needing service because the particular server is unable to properly identify the object/component needing service since the object/component needing service will not be included and/or listed in the hardware object model for the particular server, which can result in one or more inefficiencies in servicing the object/component.

BRIEF SUMMARY

Apparatus, systems, and methods that can identify distributed objects that are subject to service are provided. One apparatus includes a service action module that receives a service event from a first server in which the service event includes a first object in the first server that is subject to service and for which the first server is unable to determine an identity of the first object. The apparatus further includes an object module that determines the identity of the first object based on a first object model for a second server and a notification module that notifies a user of the identity of the first object in the first server that is subject to service. In additional or alternative embodiments, at least a portion of the service action module, the object module, and/or the notification module comprises one or more of a set of hardware circuits, a set of programmable hardware devices, and/or executable code stored on a set of non-transitory computer-readable storage media.

A method includes receiving, by a processor, a service event from a first server in which the service event includes a first object in the first server that is subject to service and for which the first server is unable to determine an identity of the first object. The method further includes determining the identity of the first object based on a first object model for a second server and notifying a user of the identity of the first object in the first server that is subject to service.

One computer program product includes a computer-readable storage medium including program instructions embodied therewith. The program instructions are executable by a processor to cause the processor to receive a service event from a first server in which the service event includes a first object in the first server that is subject to service and for which the first server is unable to determine an identity of the first object. The program instructions further cause the processor to determine the identity of the first object based on a first object model for a second server and notify a user of the identity of the first object in the first server that is subject to service.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1:
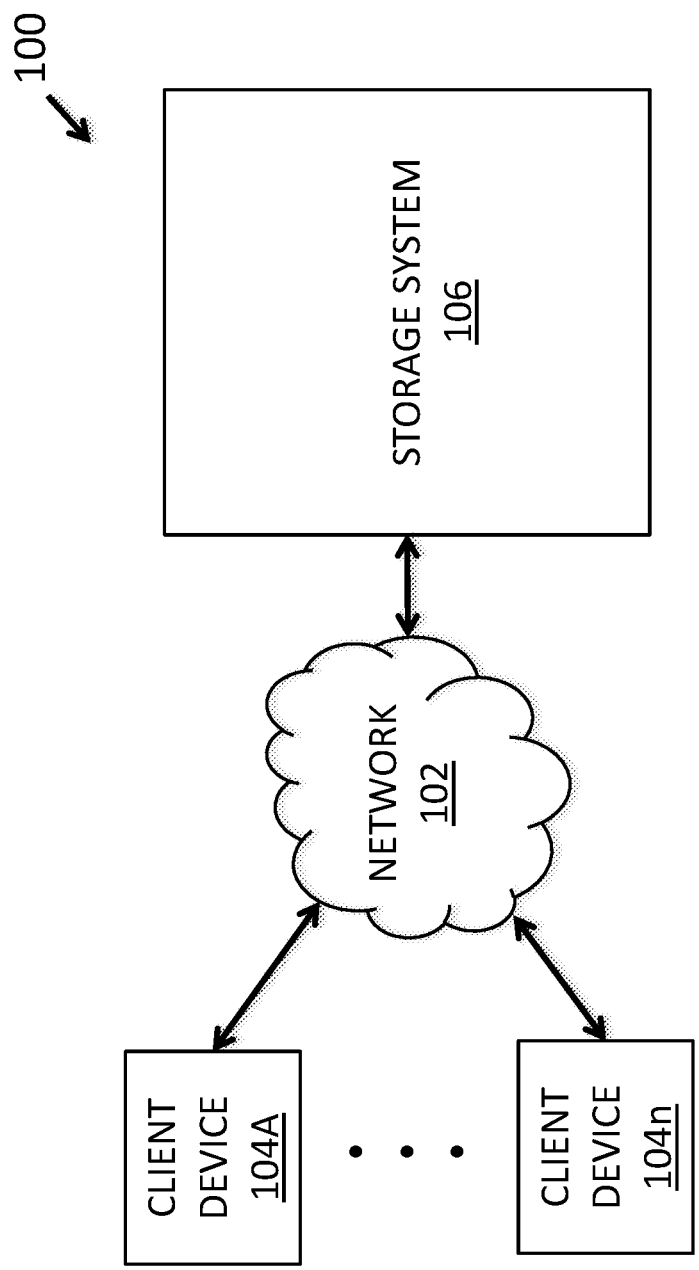
FIG. 1 is a block diagram of one embodiment of a storage network.

Disclosed herein are various embodiments providing apparatus, systems, methods, and computer program products that can identify distributed objects that are subject to service. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

[0031] To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a storage network 100 (or system) including a network 102 connecting a set of client devices 104A through 104n (also simply referred individually, in various groups, or collectively as client device(s) 104) and a storage system 106. The network 102 may be any suitable wired and/or wireless network 102 (e.g., public and/or private computer networks in any number and/or configuration (e.g., the Internet, an intranet, a cloud network, etc.)) that is known or developed in the future that enables the set of storage devices 104 and the storage system 106 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can be any suitable computing hardware and/or software (e.g., a thick client, a thin client, or hybrid thereof) capable of accessing the storage system 100 via the network 102. Each client device 104, as part of its respective operation, relies on sending I/O requests to the storage system 106 to write data, read data, and/or modify data. Specifically, each client device 104 can transmit 110 requests to read, write, store, communicate, propagate, and/or transport instructions, data, computer programs, software, code, routines, etc., to the storage system 106 and may comprise at least a portion of a client-server model. In general, the storage system 106 can be accessed by the client device(s) 104 and/or communication with the storage system 106 can be initiated by the client device(s) 104 through a network socket (not shown) utilizing one or more inter-process networking techniques.

Figure 2:
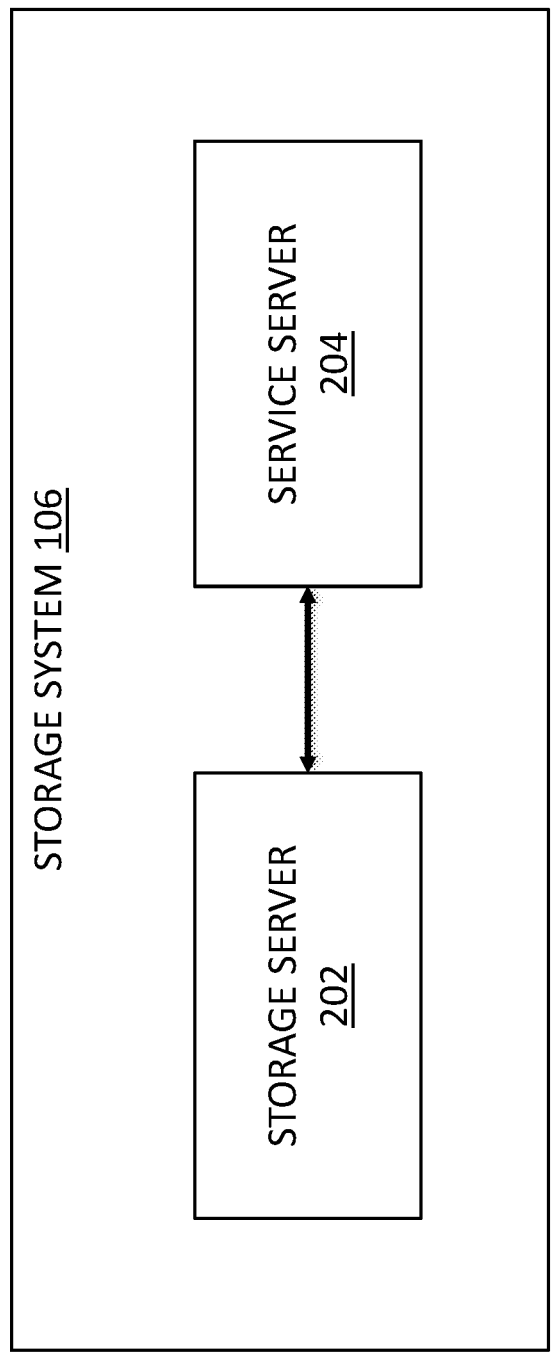
FIG. 2 is a block diagram of one embodiment of a storage system included in the storage network of FIG. 1.

Referring to FIG. 2, FIG. 2 is a block diagram of one embodiment of a storage system 106 illustrated in and discussed with reference to FIG. 1. In some embodiments, the storage system 106 includes a DS8000 server product by International Business Machines Corporation of Armonk, N.Y. That is, some embodiments incorporate and/or implement DS8000 hardware and/or software; however, other embodiments may incorporate and/or implement other suitable hardware and/or software. At least in the illustrated embodiment, the storage system includes, among other components, a storage server 202 and a service server 204.

A storage server 202 may include any suitable non-volatile/persistent hardware and/or software configured to perform and/or facilitate data storage on the storage system 106, including, but not limited to, data migration, data archiving, data backup, data rebuilding, data mirroring, replicating data, etc. For instance, a storage server 202 may include non-volatile and/or persistent hardware and/or software to perform short-term and/or long-term data storage operations on the storage system 106, which may include write operations, read operations, read-write operations, data migration operations, etc. performed thereon, among other operations that are possible and contemplated herein. In some embodiments, a storage server 202 includes a set of Power Servers manufactured by International Business Machines Corporation of Armonk, N.Y.

Figure 3:
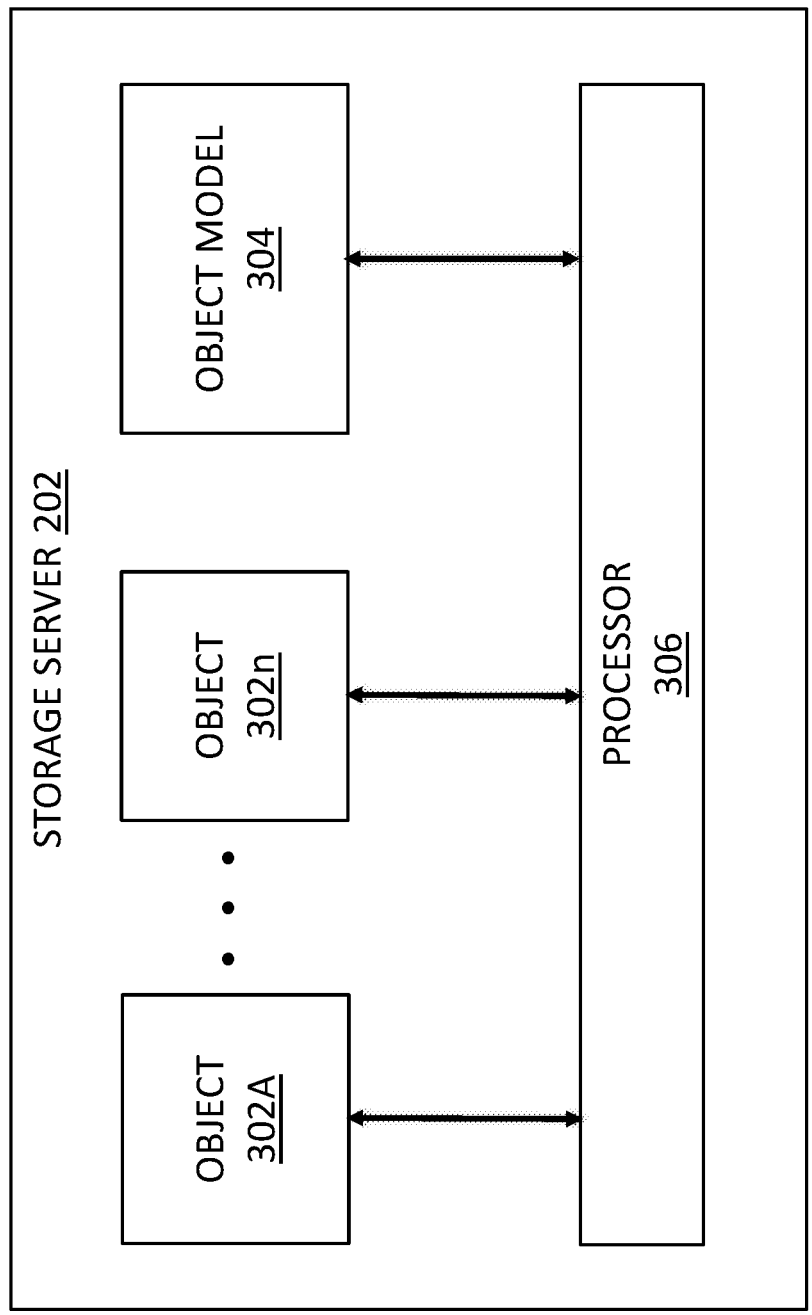
FIG. 3 is a block diagram of one embodiment of a storage server included in the storage system of FIG. 2.

With reference to FIG. 3, FIG. 3 is block diagram of one embodiment of a storage server 202 included in a storage system 106. At least in the illustrated embodiment, the storage server 202 includes, among other components, a set of objects 302A through 302n (also simply referred individually, in various groups, or collectively as object(s) 302) and an object model 304 coupled to and/or in communication with a processor 306.

An object 302 may include any suitable object and/or component (e.g., field replaceable units (FRUs)) that is known or developed in the future that can reside and/or operate on a storage server 202. Examples of an object/component include, but are not limited to, a storage device, an object model (e.g., object model 304), a processor (e.g., processor 306), a communication bus (e.g., wired and/or wireless bus), etc., among other components that are possible and contemplated herein.

In some embodiments, an object 302 can include a storage device. A storage device may include any suitable type of device and/or system that is known or developed in the future that can store computer-useable data. In various embodiments, a storage device may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, a storage device may be implemented as a direct-access storage device (DASD). A storage device, in further embodiments, may include other types of non-transitory memory such as, for example, flash memory (e.g., a solid-state devices (SSD) or other non-volatile storage devices that store persistent data), a dynamic random access memory (DRAM) device, an enhanced dynamic random access memory (EDRAIVI) device, a static random access memory (SRAM) device, a hard disk drive (HDD), a near-line drive, tape drive (e.g., magnetic and/or virtual), and/or other type(s) of memory devices (e.g., non-volatile and/or persistent), etc. that are possible and contemplated herein.

A storage device may include any suitable size that can provide storage space for one or more storage applications for a set of client devices 104. A storage device, in various embodiments, can include a size in the range of about four kilobytes (4 KB) to about one hundred terabytes (100 TB), among other sizes that are possible and contemplated herein. In some embodiments, a storage device can include a size of about one terabyte (1 TB), among other sizes that are possible and contemplated herein.

An object model 304 may include any suitable non-volatile/persistent hardware and/or software configured to provide a model of the objects 302 residing on and/or included in the storage server 202 (e.g., native objects with respect to storage server 202 and non-native objects with respect to service server 204). In various embodiments, an object model 304 can include the name, part number, description, and/or location, etc. of each object 302 residing on and/or included in the storage server 202.

A processor 306 may include any suitable non-volatile/persistent hardware and/or software configured to perform and/or facilitate data storage operations on the storage server 202, including, but not limited to, data migration, data archiving, data backup, data rebuilding, data mirroring, replicating data, etc. For instance, a processor 306 may include non-volatile and/or persistent hardware and/or software to perform short-term and/or long-term data storage operations on one or more objects 302 (e.g., storage devices) in the storage server 202, which may include write operations, read operations, read-write operations, data migration operations, etc., among other operations that are possible and contemplated herein.

In various embodiments, a processor 204 may further include any suitable hardware and/or software that can receive I/O requests (e.g., write request, read request, and/or read-write request, etc.) from the client device(s) 104 (see FIG. 1) and perform corresponding I/O operations (e.g., write operations, read operations, and/or read-write operations, etc.) on the object(s) 302 (e.g., storage device(s)) on the storage server 202 in response thereto. In some embodiments, a processor 306 further includes hardware and/or software for executing instructions in one or more modules and/or applications that can determine when/if an object 302 is subject to service (e.g., needs to be serviced/replaced, should be serviced/replaced, and/or requires servicing/replacing, etc., among other service possibilities).

Figure 4:
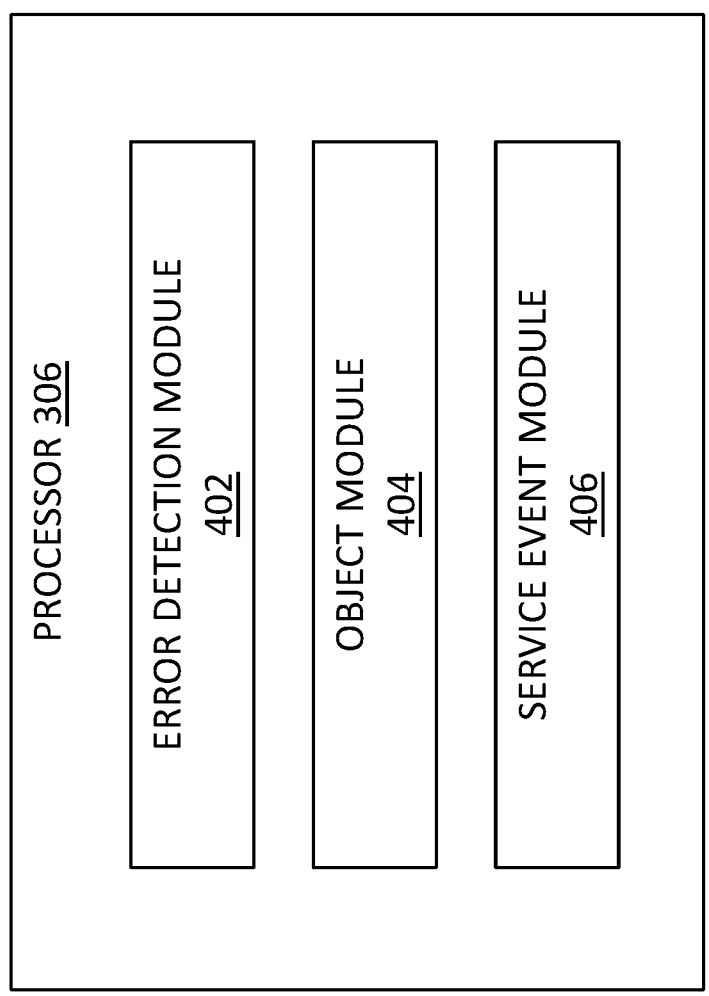
FIG. 4 is a block diagram of one embodiment of a processor included in the storage server of FIG. 3.

Referring to FIG. 4, FIG. 4 is block diagram of one embodiment of a processor 306 that can be included in the storage server 202 illustrated in and discussed with reference to FIG. 3. At least in the illustrated embodiment, the processor 306 includes, among other components, an error detection module 402, an object module 404, and a service event module 406.

An error detection module 402 may include any suitable hardware and/or software that can detect an error and/or malfunction in a storage system 106 (e.g., storage server 202 and service server 204). The error detection module 402 may detect the error/malfunction using any suitable technique, algorithm, and/or method that is known or developed in the future. In response to detecting an error/malfunction, the error detection module 402 can notify (e.g., transmit an error notice to) the object module 404 and/or the service event module 406 of such error/malfunction.

An object module 404 may include any suitable hardware and/or software that can determine the object 302 or object 502 (see FIG. 5) in the storage system 106 that is experiencing the detected error and/or malfunction. The object module 404 may determine the object 302 or object 502 that is experiencing the error/malfunction using any suitable technique, algorithm, and/or method that is known or developed in the future.

In various embodiments, an object module 404 can determine whether an object experiencing the error is a native object (e.g., an object 302) or a non-native object (e.g., an object 502). In various embodiments, the object module 404 can determine that the object experiencing the error is an object 302 (e.g., a native object with respect to the storage server 202) because the object module 404 can find the object 302 in its object model 304. For example, the object module 404 can compare the object experiencing the error to the set of objects 302 included and/or listed in the object model 304 and determine that the object is a native object 302 because the object experiencing the error will match a native object 302 in the object model 304. In response to determining that a native object 302 is experiencing the error, the object module 404 is configured to transmit the identity of the native object 302 to the service event module 406.

In additional or alternative embodiments, the object module 404 can determine that the object experiencing the error is an object 502 (e.g., a non-native object with respect to the storage server 202) because the object module 404 will be unable to find the object 502 in its object model 304. For example, the object module 404 can compare the object experiencing the error to the set of objects 302 included and/or listed in the object model 304 and determine that the object is a non-native object 502 because the object experiencing the error will not match any native object 302 in the object model 304. In response to determining that a non-native object 502 is experiencing the error (e.g., is unable to identify the object 502 in the object model 304), the object module 404 is configured to generate and assign a symbolic identifier to the object 502. The object module 404 is further configured to transmit the symbolic identifier for the non-native object 502 to the service event module 406.

A symbolic identifier may include any suitable description of the object 502. For example, a symbolic identifier may include a logical name, a functional description, and/or a location code, etc. for the object 502, among other descriptors that are possible and contemplated herein.

A service event module 406 may include any suitable hardware and/or software that can generate a service event. In various embodiments, the service event module 406 generates the service event in response to receiving an error notice from an error detection module 402 and 1) the identity of a native object 302; or 2) a symbolic identifier for a non-native object 502.

For a native object 302 that is subject to service, a service event may include any suitable information and/or data that can indicate that a native object 302 is subject to service and provide the identity of the native object 302. For a non-native object 502 that is subject to service, a service event may include any suitable information and/or data that can indicate that a non-native object 502 is subject to service and provide the symbolic identifier generated for the non-native object 502. In response to generating a service event, the service event module 406 is configured to transmit the service event to a service server 204.

Figure 5:
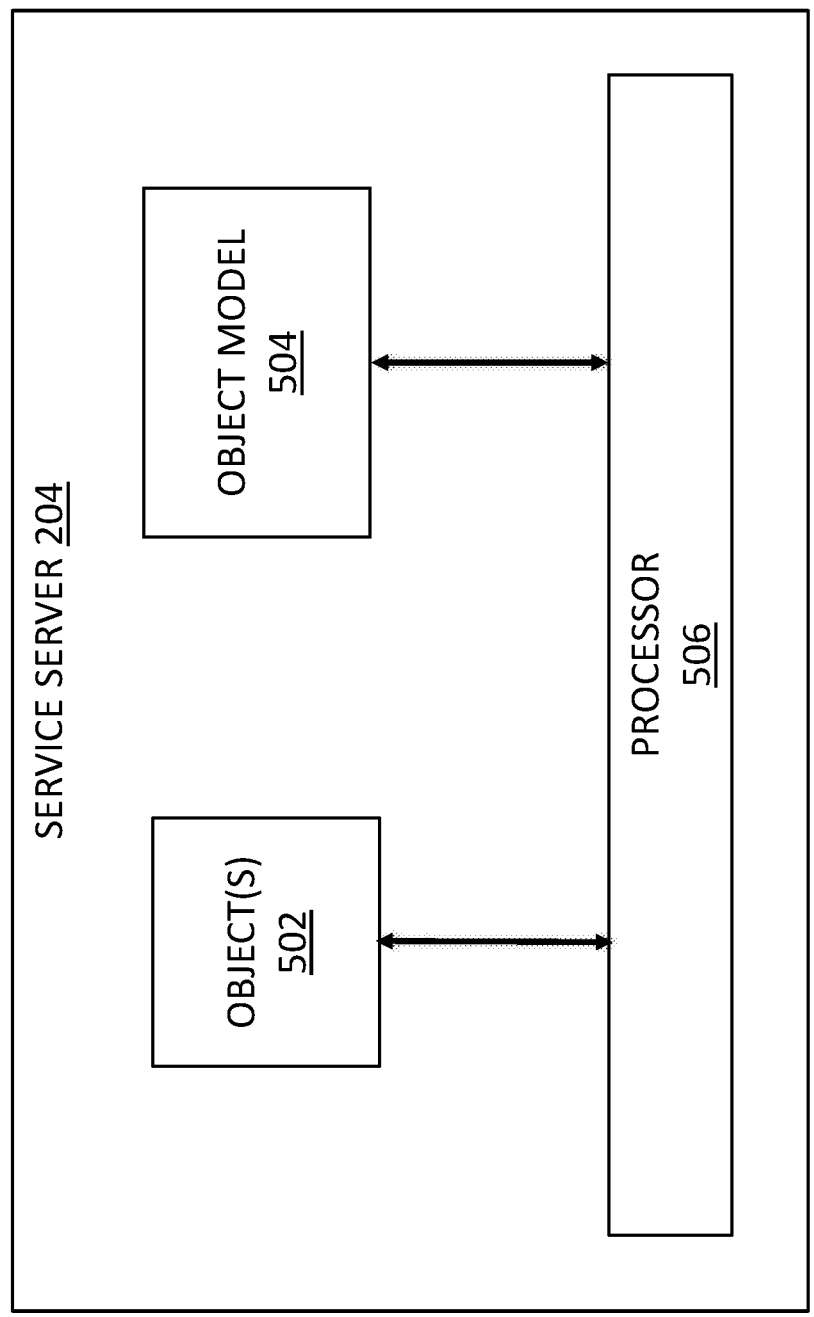
FIG. 5 is a block diagram of one embodiment of a service server included in the storage system of FIG. 2.

With reference to FIG. 5, FIG. 5 is a block diagram of service server 204 included in a storage system 106. At least in the illustrated embodiment, the service server 202 includes, among other components, one or more objects 502 and an object model 504 coupled to and/or in communication with a processor 506.

An object 502 may include any suitable object and/or component (e.g., FRU) that is known or developed in the future that can reside and/or operate on a service server 204. Examples of object(s)/component(s) include, but are not limited to, one or more service components (e.g., components that can perform various repair functions on other components), one or more service objects (e.g., objects that can perform various repair functions on other objects), an object model (e.g., object model 504), a processor (e.g., processor 506), a communication bus (e.g., wired and/or wireless bus), input/output (I/O) components, etc., among other objects and/or components that are possible and contemplated herein.

An object model 504 may include any suitable non-volatile/persistent hardware and/or software configured to provide a model of the objects 502 residing on and/or included in the service server 204 (e.g., native objects with respect to service server 204 and non-native objects with respect to storage server 202). In various embodiments, an object model 504 can include the name, part number, description, and/or location, etc. of each object 502 residing on and/or included in the service server 204.

A processor 506 may include any suitable non-volatile/persistent hardware and/or software configured to perform and/or facilitate servicing objects (e.g., objects 302 and objects 502) in a storage system 106. For instance, a processor 506 may include non-volatile and/or persistent hardware and/or software to notify one or more users (e.g., one or more repair technicians) that there is an error in the storage system 106 and the identity of the object(s) 302/502 experiencing the error.

Figure 6:
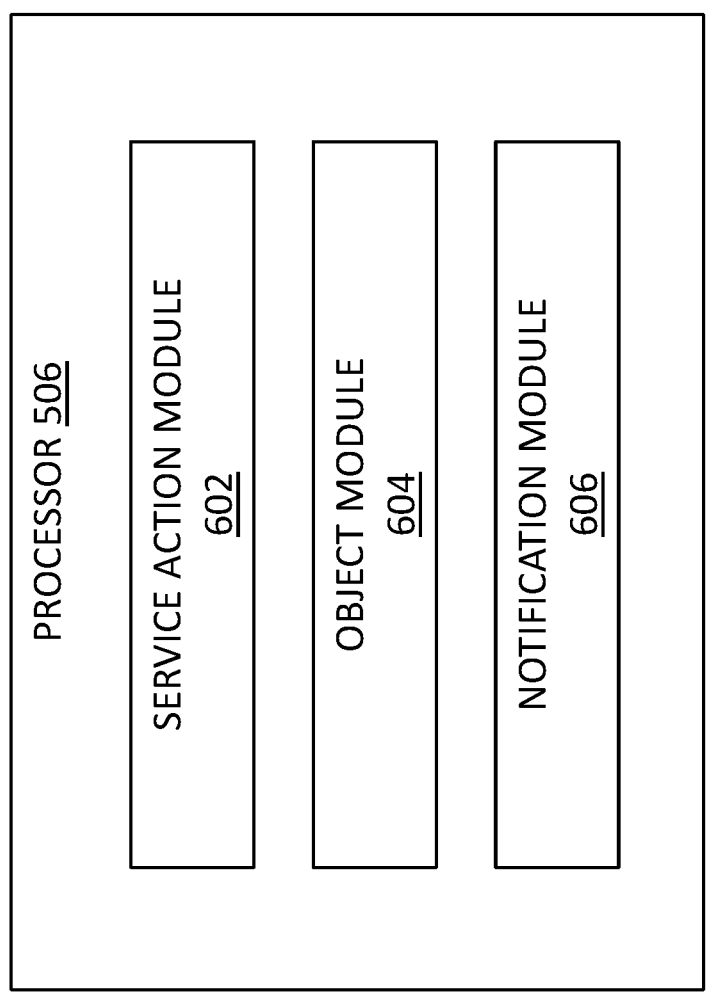
FIG. 6 is a block diagram of one embodiment of a processor included in the service server of FIG. 5.

Referring to FIG. 6, FIG. 6 is block diagram of one embodiment of a processor 506 that can be included in the service server 204 illustrated in and discussed with reference to FIG. 5. At least in the illustrated embodiment, the processor 506 includes, among other components, a service action module 602, an object module 604, and a notification module 606.

A service action module 602 may include any suitable hardware and/or software that can receive a service event from a storage server 202. The service event may include an indication that one or more objects on the storage system 106 (e.g., on storage server 202 and/or service server 204) is experiencing an error and/or malfunction.

The service action module 602 is configured to determine whether the service event is complete in response to receiving the service event. In some embodiments, a service event is complete when the object(s) experiencing an error/malfunction are properly identified (e.g., the service event does not include a symbolic identifier). In additional or alternative embodiments, a service event is incomplete when the object(s) experiencing an error/malfunction are not properly identified (e.g., the service event includes one or more symbolic identifiers).

In various embodiments, the service action module 602 is configured to generate a service action report that includes the identity of the object(s) experiencing the error in response to the service event being complete. The service action module 602 is further configured to transmit the service action report to the notification module 606 in response to generating the service action report.

In additional or alternative embodiments, the service action module 602 is configured to query the object module 604 to determine the identity of the object(s) experiencing an error in response to the service event being incomplete (e.g., uses a symbolic identifier to represent one or more object(s) experiencing an error). The service action module 602 is further configured to receive an answer from the object module 604 that identifies each object in the service event represented by a symbolic identifier. Further, the service action module 602 is configured to complete the previously incomplete service event by identifying the object(s) experiencing an error, generate a service action report that includes the identity of the object(s) experiencing the error in response to the service event being complete, and transmit the service action report to the notification module 606 in response to generating the service action report.

An object module 604 may include any suitable hardware and/or software that can receive a query from a service action module 602 to determine the identity of an object 502 represented by a symbolic identifier in a service event. The object module 604 may determine the identity of the object 502 represented by a symbolic identifier using any suitable technique, algorithm, and/or method that is known or developed in the future.

In various embodiments, the object module 604 compares the symbolic identifier to the objects in the object model 504 for the service server 204 to determine a match. In some embodiments, the object 502 on the service server 204 experiencing an error is identified by matching the logical name, the functional description, and/or the location code, etc. included in the symbolic identifier to the objects 502 on the service server 204 that are listed in the object model 504 for the service server 204.

The object module 604 is further configured to generate an answer to the query from the service action module 602 in which the answer includes the identity of each object represented by a symbolic identifier in the service event. The object module 604 further transmits the answer to the service action module 602 in response to generating the answer.

A notification module 406 may include any suitable hardware and/or software that can provide a service action report to one or more users. In various embodiments, the notification module 606 receiving a service action report from the service action module 602 and transmits/forwards the service action report to the user(s) (e.g., one or more repair technicians).

Figure 7:
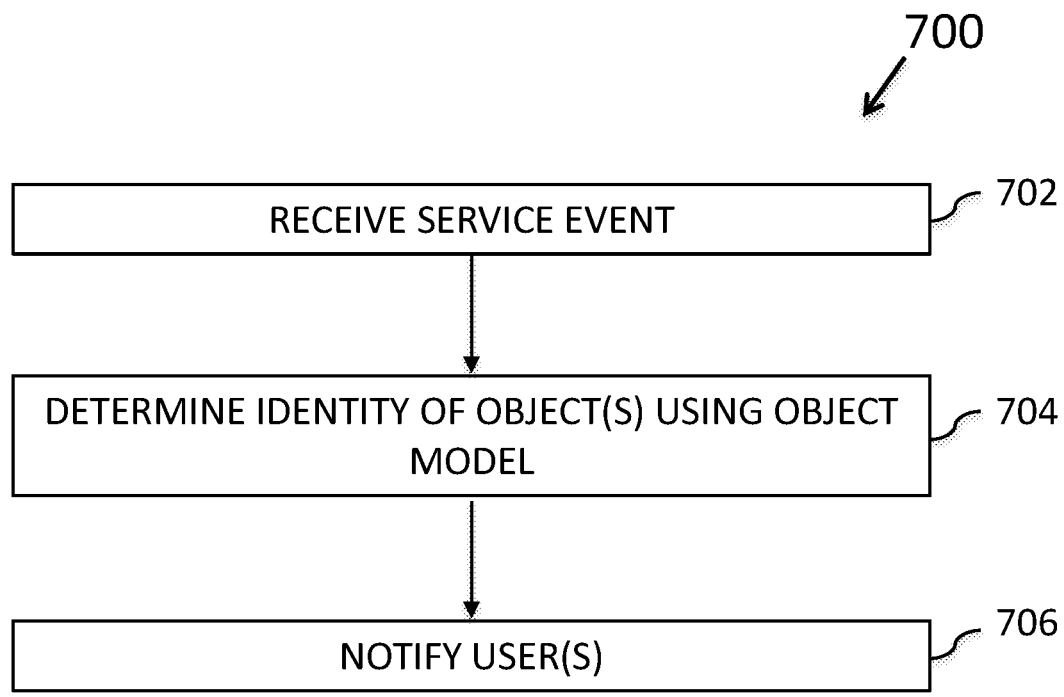
FIG. 7 is a schematic flow chart diagram illustrating one embodiment of a method for identifying distributed objects subject to service.

With reference to FIG. 7, FIG. 7 is a schematic flow chart diagram illustrating one embodiment of a method 700 for identifying distributed objects that are subject to service. At least in the illustrated embodiment, the method 700 begins by a processor 506 receiving (e.g., via a service action module 602) a service event from a processor 306 of a storage server 202 (block 702).

The service event can include one or more objects 502 that are each represented by a different symbolic identifier. In other words, the service event includes one or more objects that the processor 306 and/or storage server 202 is unable to identify. That is, the one or more objects 502 in the service event are non-native objects with respect to the storage server 202.

The processor 506 further determines (e.g., via an object module 604) the identity of each object 502 in the service event (block 704). In various embodiments, the identity of each object 502 is determined using an object model 504. In some embodiments, the identity of each object 502 is determined by matching the symbolic identifier for an object 502 experiencing an error to the objects listed in the object model 504, as discussed elsewhere herein.

Further, the processor 506 notifies (e.g., via a notification module 606) a set of users of the identity of the object 502 experiencing the error (block 706). The processor 506, in some embodiments, may transmit a service action report that includes the identity of the object 502 experiencing the error to the user(s) (e.g., repair technicians).

Figure 8:
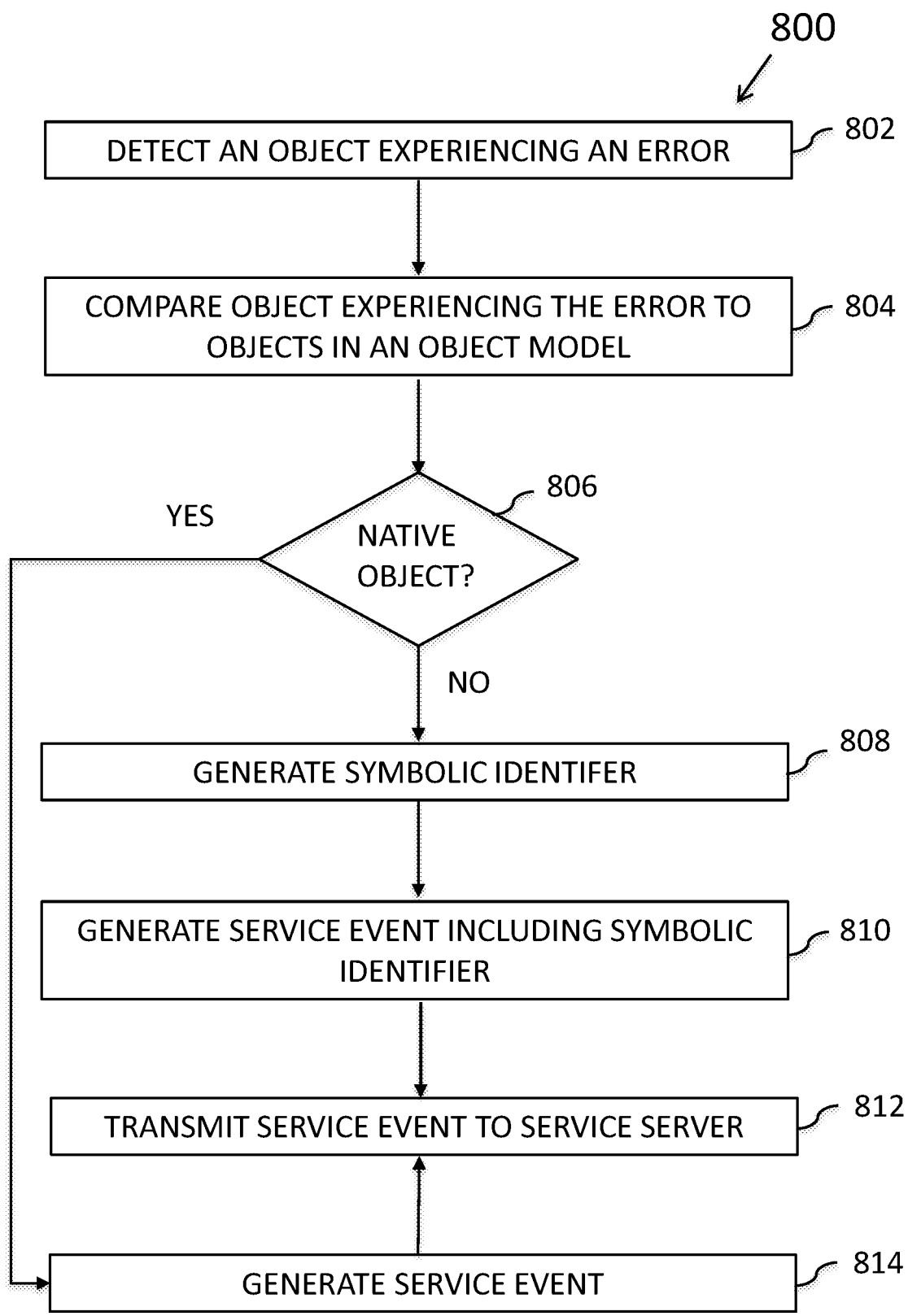
FIG. 8 is a schematic flow chart diagram illustrating another embodiment of a method for identifying distributed objects subject to service.

Referring to FIG. 8, FIG. 8 is a schematic flow chart diagram illustrating another embodiment of a method 800 for identifying distributed objects that are subject to service. At least in the illustrated embodiment, the method 800 begins by a processor 306 on a storage server 202 detecting that an object on a storage system 106 is experiencing an error (block 802).

In response to detecting the error, the processor 306 compares the object experiencing the error to the set of objects 302 in the object model 304 for the storage server 202 (block 804). Further, the processor 306 determines whether the object experiencing the error is a native object with respect to the storage server 202 (block 806).

In response to the object experiencing the error being a non-native object 502 (e.g., a "NO" in block 806), the processor 306 generates a symbolic identifier for the non-native object 502 (block 808). The symbolic identifier may include any type of descriptor, as discussed elsewhere herein.

The processor 306 further generates a service event that includes the non-native object 502 represented by the symbolic identifier generated for the non-native object 502 (block 810). The service event is then transmitted to a service server 204 (block 812).

In response to the object experiencing the error being a native object 302 (e.g., a "YES" in block 806), the processor 306 generates a service event that includes the identity of the native object 302 (block 814). The service event is then transmitted to the service server 204 (block 810).

Figure 9:
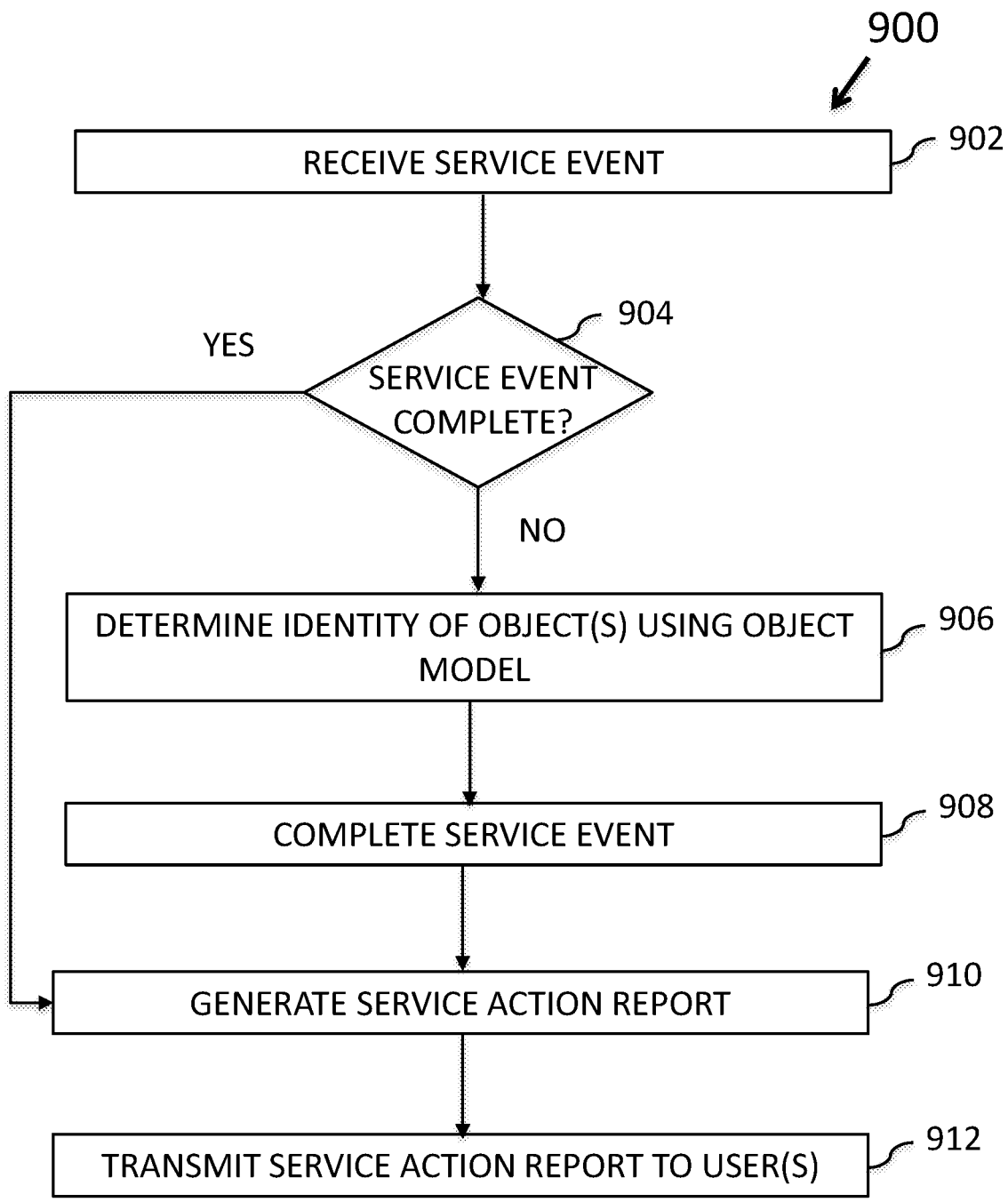
FIG. 9 is a schematic flow chart diagram illustrating yet another embodiment of a method for identifying distributed objects subject to service.

With reference to FIG. 9, FIG. 9 is a schematic flow chart diagram illustrating yet another embodiment of a method 900 for identifying distributed objects that are subject to service. At least in the illustrated embodiment, the method 900 begins by a processor 506 receiving (e.g., via a service action module 602) a service event from a processor 306 of a storage server 202 (block 902).

The service event can include one or more objects 502 that are each represented by a different symbolic identifier. In other words, the service event includes one or more objects that the processor 306 and/or storage server 202 is unable to identify. That is, the one or more objects 502 in the service event are non-native objects with respect to the storage server 202.

The processor 506 further determines whether the service event is complete (block 904). In some embodiments, a service event is complete when the object(s) experiencing an error/malfunction are properly identified (e.g., the service event does not include a symbolic identifier). In additional or alternative embodiments, a service event is incomplete when the object(s) experiencing an error/malfunction are not properly identified (e.g., the service event includes one or more symbolic identifiers).

In response to the service event being incomplete (e.g., a "NO" in block 904), the processor 506 is configured to determine (e.g., via an object module 604) the identity of the object 502 in the service event (block 906). In various embodiments, the identity of each object 502 is determined using an object model 504. In some embodiments, the identity of each object 502 is determined by matching the symbolic identifier for an object 502 experiencing an error to the objects listed in the object model 504, as discussed elsewhere herein.

In response to determining the identity of the object(s) 502 in the service event, the processor is configured to complete the service event (block 908). The service event may be completed by replacing the symbolic identifier with the actual identity of the object 502 (e.g., part number, name, etc.) in the service event.

The processor 506, in response to completing the service event, generates a service action report that includes the identity of the object 502 experiencing the error (block 910). The service action report is then transmitted to a set of users and/or repair technicians (block 912).

In response to the service event being complete (e.g., a "YES" in block 904), the processor 506 generates a service action report that includes the identity of the object 302 experiencing the error (block 910). The service action report is then transmitted to a set of users and/or repair technicians (block 912).

Figure 10:
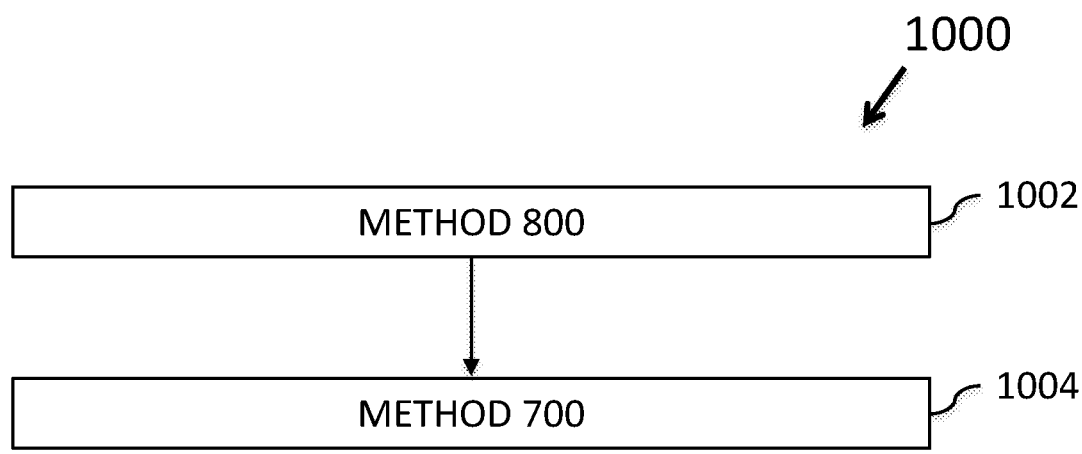
FIG. 10 is a schematic flow chart diagram illustrating still another embodiment of a method for identifying distributed objects subject to service.

Referring to FIG. 10, FIG. 10 is a schematic flow chart diagram illustrating yet another embodiment of a method 1000 for identifying distributed objects that are subject to service. At least in the illustrated embodiment, method 1000 begins by a processor 306 performing the method 800 illustrated in and discussed with reference to FIG. 8 (block 1002). The method 1000 further includes a processor 506 performing the method 700 illustrated in and discussed with reference to FIG. 7 (block 1004).

Figure 11:
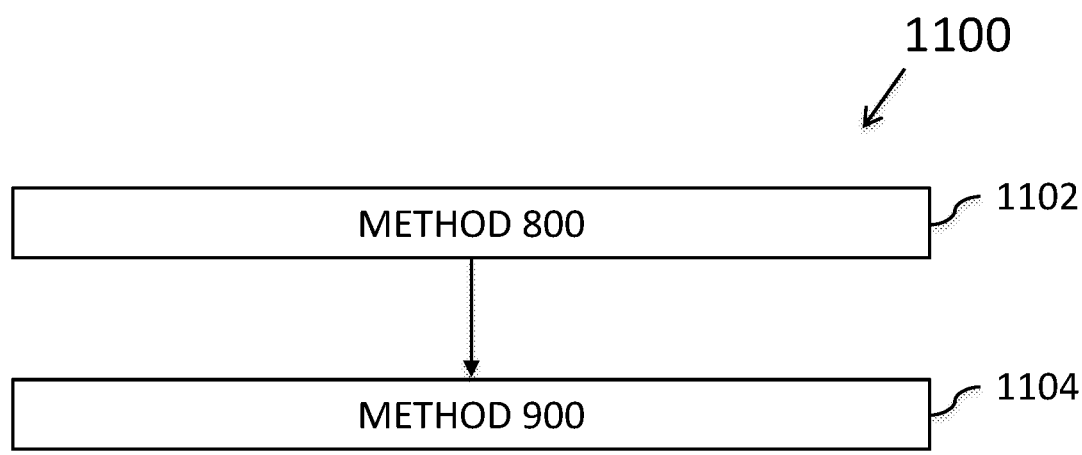
FIG. 11 is a schematic flow chart diagram illustrating another embodiment of a method for identifying distributed objects subject to service.

With reference to FIG. 11, FIG. 11 is a schematic flow chart diagram illustrating still yet another embodiment of a method 1100 for identifying distributed objects that are subject to service. At least in the illustrated embodiment, method 1100 begins by a processor 306 performing the method 800 illustrated in and discussed with reference to FIG. 8 (block 1102). The method 1100 further includes a processor 506 performing the method 900 illustrated in and discussed with reference to FIG. 9 (block 1104).

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
   a service action module that receives a service event from a first server, the service event including a first object in the first server that is subject to service and for which the first server is unable to determine an identity of the first object;
   an object module that determines the identity of the first object based on a first object model for a second server; and
   a notification module that notifies a user of the identity of the first object in the first server that is subject to service,
   wherein at least a portion of each of said modules comprise one or more of a set of hardware circuits, a set of programmable hardware devices, and executable code stored on a set of non-transitory computer-readable storage media.

2. The apparatus of claim 1, wherein the first object is a native first object in the first object model for the second server.

3. The apparatus of claim 2, wherein the first server is unable to determine the identity of the first object based on a second object model for the first server.

4. The apparatus of claim 3, wherein the first object is a non-native first object in the second object model for the first server.

5. The apparatus of claim 1, wherein:
   the service event includes a symbolic identifier assigned to the first object, the symbolic identifier including a description of the object; and
   the first object module is further configured to determine the identity of the first object based on the symbolic identifier.

6. The apparatus of claim 5, wherein, in determining the identity of the first object based on the symbolic identifier, the first object module is configured to:
   compare the symbolic identifier to a set of objects in the first object model for the second server to determine a match; and
   determine the identity of the first object based on a second object in the set of objects matching the description of the object included in the symbolic identifier.

7. The apparatus of claim 1, wherein:
   the first object is a non-native object in a second object model for the first server, the first server including a storage server; and
   the first object includes a native object in a first object model for a second server, the second server including service server.

8. A method, comprising:
   receiving, by a processor, a service event from a first server, the service event including a first object in the first server that is subject to service and for which the first server is unable to determine an identity of the first object;
   determining the identity of the first object based on a first object model for a second server; and
   notifying a user of the identity of the first object in the first server that is subject to service.

9. The method of claim 8, wherein the first object is a native first object in the first object model for the second server.

10. The method of claim 9, wherein the first server is unable to determine the identity of the first object based on a second object model for the first server.

11. The method of claim 10, wherein the first object is a non-native first object in the second object model for the first server.

12. The method of claim 8, wherein:
    the service event includes a symbolic identifier assigned to the first object, the symbolic identifier including a description of the object; and
    determining the identity of the first object is based on the symbolic identifier.

13. The method of claim 12, wherein determining the identity of the first object based on the symbolic identifier comprises:
    comparing the symbolic identifier to a set of objects in the first object model for the second server to determine a match; and
    determining the identity of the first object based on a second object in the set of objects matching the description of the object included in the symbolic identifier.

14. The method of claim 8, wherein:
    the first object is a non-native object in a second object model for the first server, the first server including a storage server; and
    the first object includes a native object in a first object model for a second server, the second server including service server.

15. A computer program product comprising a computer-readable storage medium including program instructions embodied therewith, the program instructions executable by a processor to cause the processor to:
    receive a service event from a first server, the service event including a first object in the first server that is subject to service and for which the first server is unable to determine an identity of the first object;
    determine the identity of the first object based on a first object model for a second server; and
    notify a user of the identity of the first object in the first server that is subject to service.

16. The computer program product of claim 15, wherein the first object is a native first object in the first object model for the second server.

17. The computer program product of claim 16, wherein the first server is unable to determine the identity of the first object based on a second object model for the first server.

18. The computer program product of claim 17, wherein the first object is a non-native first object in the second object model for the first server.

19. The computer program product of claim 15, wherein:
- the service event includes a symbolic identifier assigned to the first object, the symbolic identifier including a description of the object; and
- determining the identity of the first object is based on the symbolic identifier.

20. The computer program product of claim 19, wherein, in determining the identity of the first object based on the symbolic identifier, the processor is configured to:
- compare the symbolic identifier to a set of objects in the first object model for the second server to determine a match; and
- determine the identity of the first object based on a second object in the set of objects matching the description of the object included in the symbolic identifier.

* * * * *